H. J. LONG.
SCALE ATTACHMENT FOR ICE BOXES.
APPLICATION FILED SEPT. 14, 1920.
1,409,872.
Patented Mar. 14, 1922.
5 SHEETS—SHEET 1.
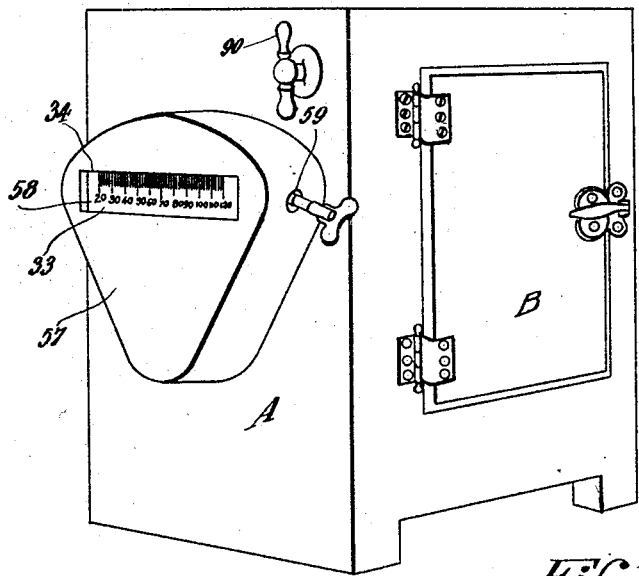
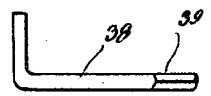
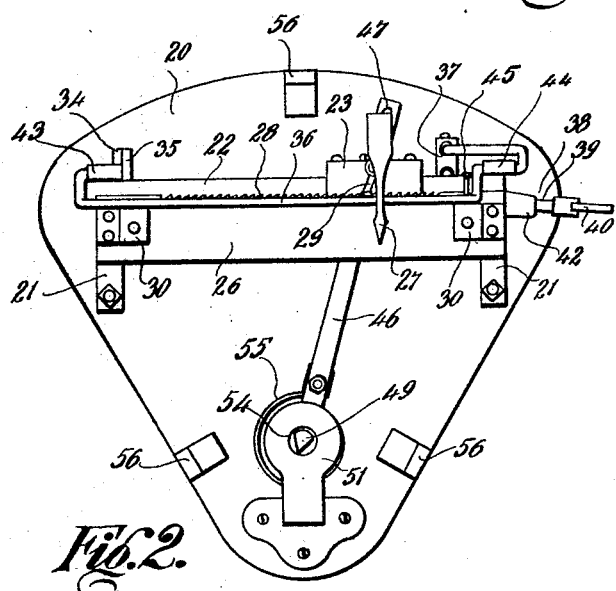
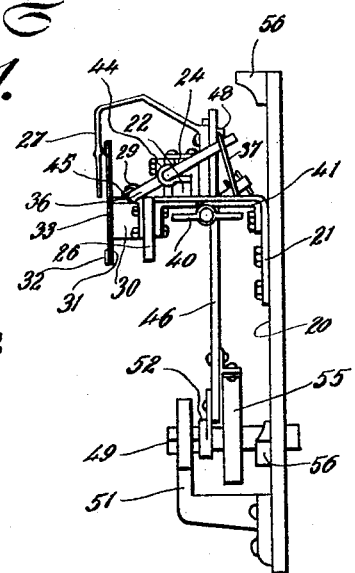
HARVEY J. LONG, INVENTOR
BY Victor J. Evans, ATTORNEY
WITNESS:

H. J. LONG.
SCALE ATTACHMENT FOR ICE BOXES.
APPLICATION FILED SEPT. 14, 1920.
1,409,872.
Patented Mar. 14, 1922.
5 SHEETS—SHEET 2.
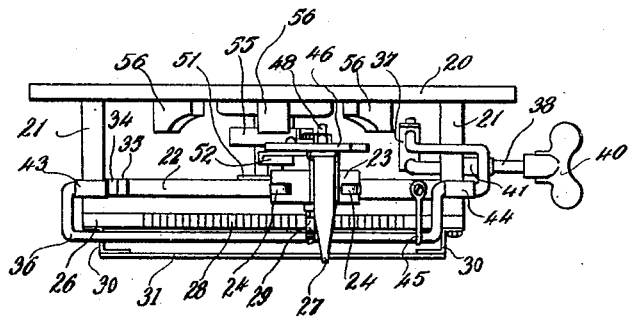
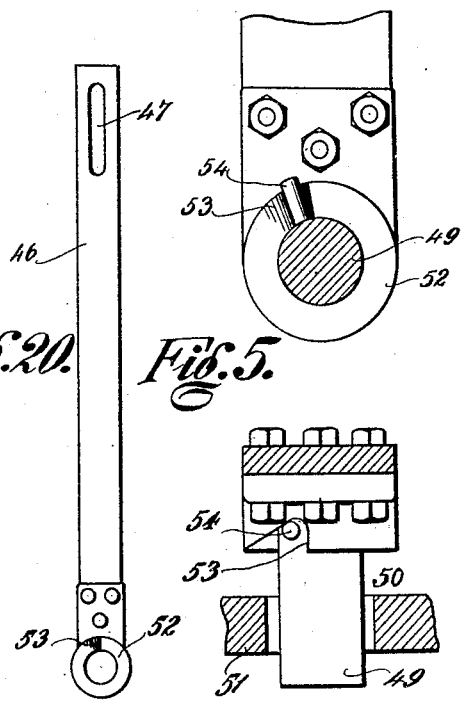
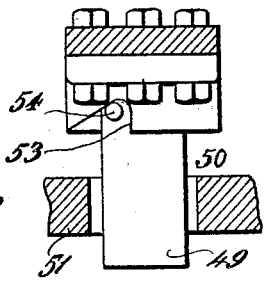
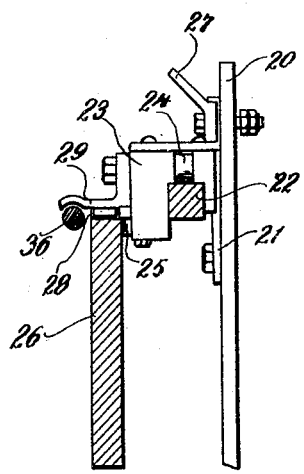
HARVEY J. LONG
INVENTOR
BY Victor J. Evans
ATTORNEY

H. J. LONG.
SCALE ATTACHMENT FOR ICE BOXES.
APPLICATION FILED SEPT. 14, 1920.

1,409,872.

Patented Mar. 14, 1922.
5 SHEETS—SHEET 3.

HARVEY J. LONG
INVENTOR

BY Victor J. Evans
ATTORNEY

WITNESS:

H. J. LONG.
SCALE ATTACHMENT FOR ICE BOXES.
APPLICATION FILED SEPT. 14, 1920.

1,409,872.

Patented Mar. 14, 1922.
5 SHEETS—SHEET 4.

HARVE J. LONG
INVENTOR

BY Victor J. Evans
ATTORNEY

WITNESS:

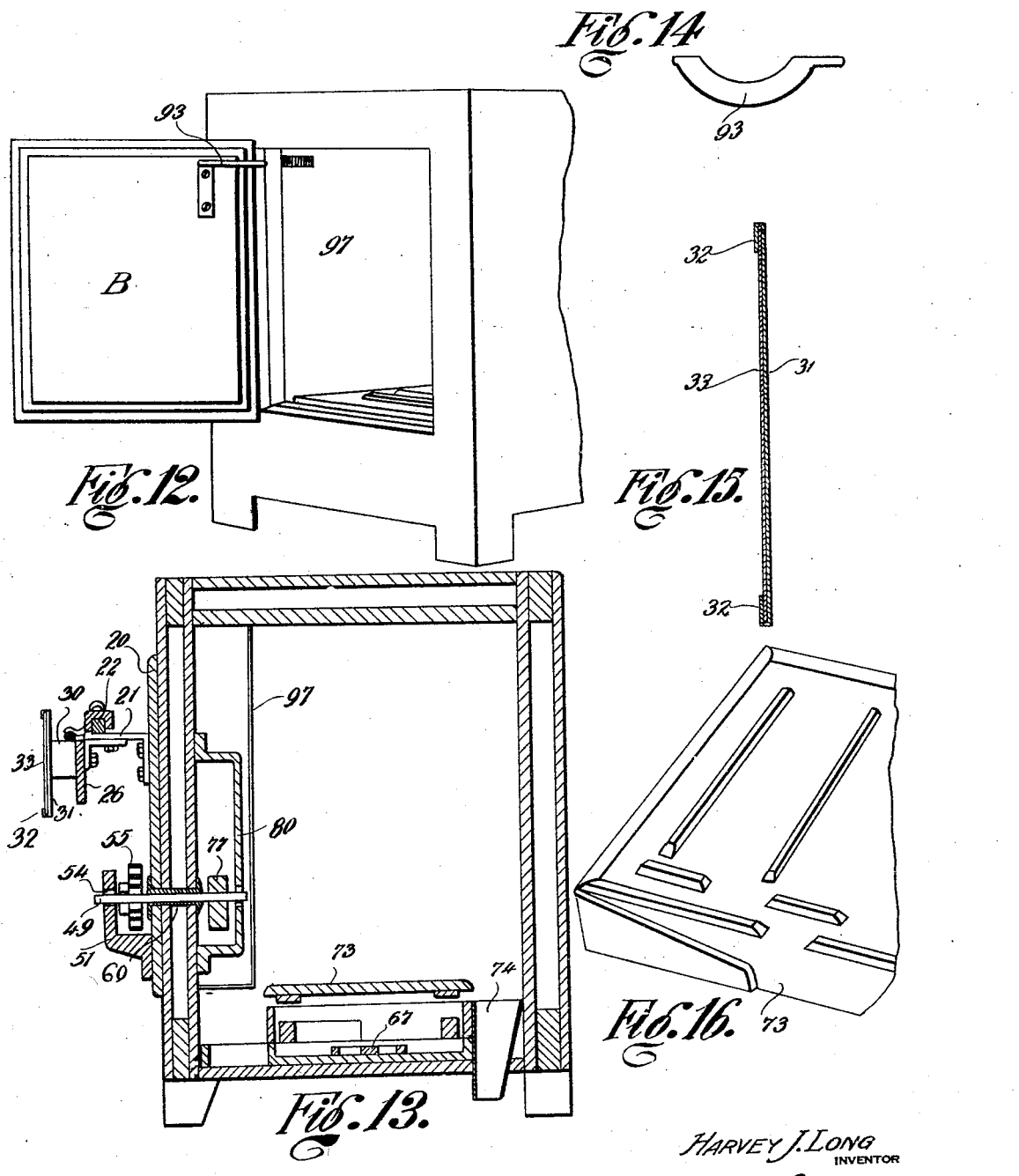

UNITED STATES PATENT OFFICE.

HARVEY J. LONG, OF PLATTSMOUTH, NEBRASKA.

SCALE ATTACHMENT FOR ICE BOXES.

1,409,872.  Specification of Letters Patent.  Patented Mar. 14, 1922.

Application filed September 14, 1920. Serial No. 410,103.

*To all whom it may concern:*

Be it known that I, HARVEY J. LONG, a citizen of the United States, residing at Plattsmouth, in the county of Cass and State of Nebraska, have invented new and useful Improvements in Scale Attachments for Ice Boxes, of which the following is a specification.

This invention relates to refrigerators or ice boxes, particularly to attachments therefor, and has for its object the provision of a scale attachment adapted for use in connection with a front, rear, or side feed ice box or refrigerator whereby to indicate or register the weight of ice put into the ice chamber.

An important object is the provision of a device of this character which is so constructed that the indicating means will automatically lock upon registering and stay locked until the mechanism is released by a key so that tampering with the indicator will be prevented.

Another object is the provision of a device of this character which is so constructed that the ice box door will have to be closed before the indicator will register, this feature further insuring accurate weighing and preventing any falsification whatever.

Another object is the provision of a device of this character including a novel indicating mechanism mounted exteriorly of the ice box or refrigerator and an actuating mechanism for the indicator located within the ice box and including a scale structure.

An additional object is the provision of a mechanism of this character which will be comparatively simple and inexpensive in construction, highly efficient in use, positive and accurate in action, durable in service, and a general improvement in the art.

With the above and other objects and advantages in view, the invention consists in the details of construction to be hereinafter more fully described and claimed, and illustrated in the accompanying drawings in which—

Figure 8:
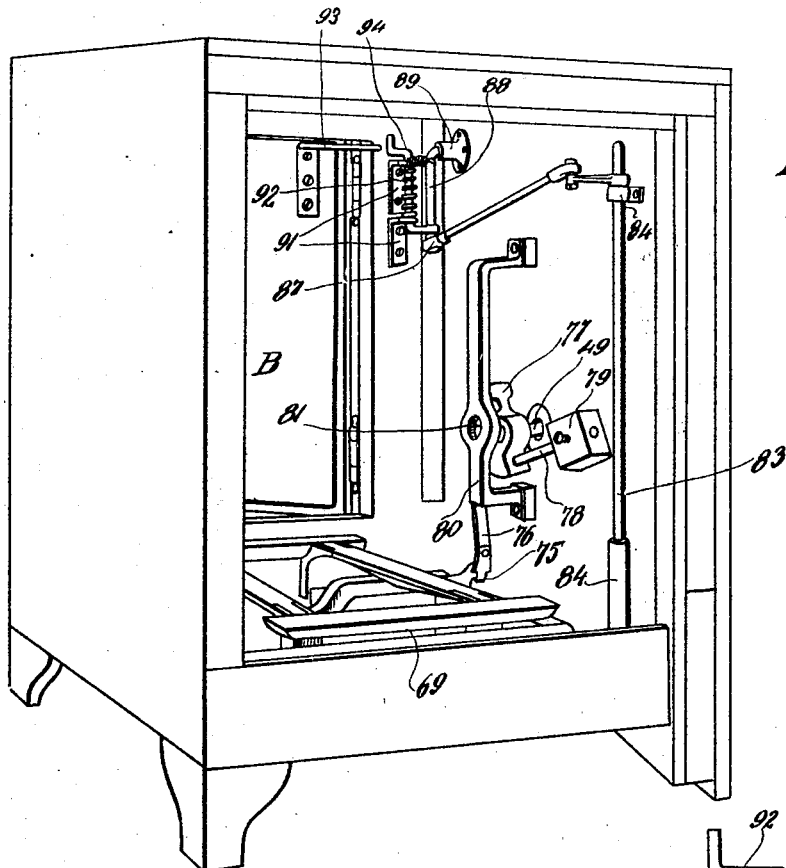
Figure 10:
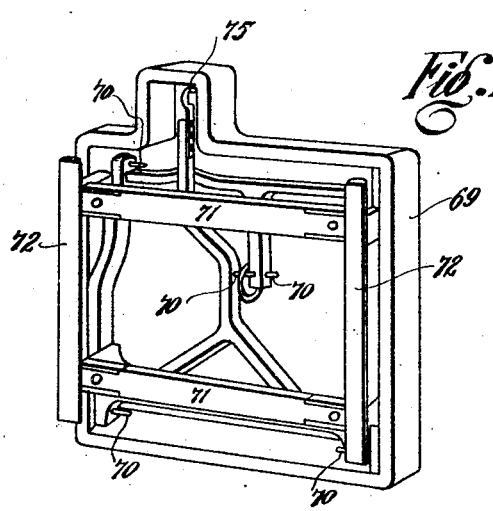
Figure 17:
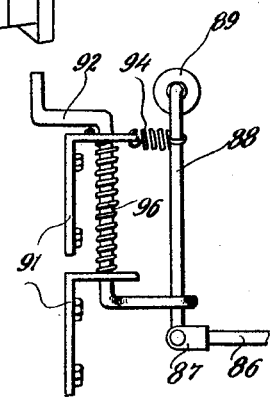
Figure 9:
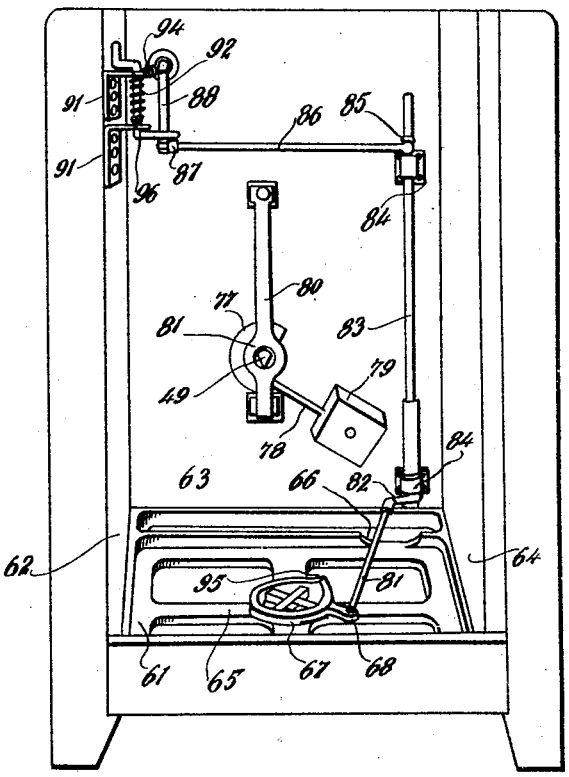
Figure 11:
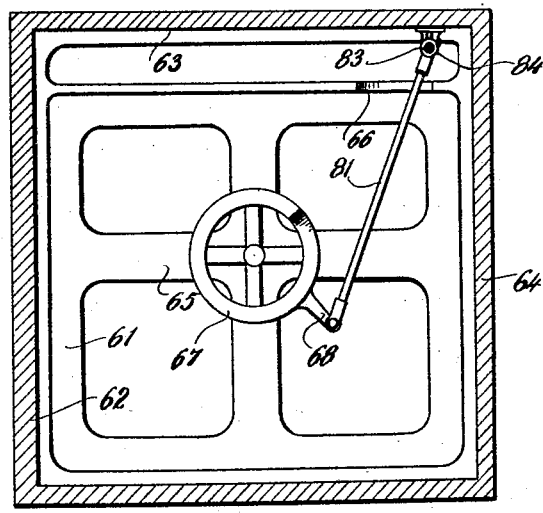

Figure 1 is a perspective view of an ice box showing my device associated therewith, Figure 2 is a face portion of the indicating and registering mechanism with the cover removed, Figure 3 is a side elevation thereof with the cover removed, Figure 4 is a plan view thereof with the cover removed, Figures 5, 6 and 7 are detail views of the indicator mechanism, Figure 8 is a perspective view of the interior of the ice box with one wall thereof removed, Figure 9 is a similar view with a wall removed and viewing it from a different angle, Figure 10 is a detail perspective view of the scale structure mounted within the bottom of the ice box, Figure 11 is a horizontal sectional view showing in plan the structure at the bottom of the ice box, Figure 12 is a fragmentary perspective view of the front portion of the ice box with the door open and showing the mechanism carried by the door, Figure 13 is a longitudinal sectional view through the complete mechanism in position, Figure 14 is a detail elevation of a relief element, Figure 15 is a detail sectional view through the front of the scale cover, Figure 16 is a fragmentary perspective view of the ice platform, Figure 17 is a detail elevation of the door operated releasing mechanism, and Figures 18 and 19 are detail views of certain elements.

Referring more particularly to the drawings, the portion of the mechanism which is mounted upon the outside of the ice box comprises a preferably segmental shaped plate 20 upon which are bolted two brackets 21 which are arranged in horizontal alignment and which carry a rod 22 square in cross section. A trolley structure 23 is mounted upon this rod 22 and is formed of suitable iron strips bent at right angles, as shown, and this trolley carries rollers 24 which travel upon the rod 22 and also carries a guide roller 25 which engages against a plate 26 which is secured in position with its top edge C flush with or in alignment with the bottom edge of the rod 22. The numeral 27 designates an indicator or pointer which is suitably secured upon the trolley 23. The plate 26 is formed at its upper edge with a plurality of notches 28 which correspond in number to the number of certain graduations to be hereinafter described.

Carried by the trolley 23 is a dog or pawl 29 which engages the notches 28 for preventing retrograde movement of the trolley after it has once been moved by means to be hereinafter described. Secured upon the plate 26 are brackets 30 which carry a plate 31 having its edge rolled to provide flanges 32 which serve as retaining means for card 33 graduated as clearly shown, to indicate pounds. In the present instance the scale is shown graduated in tens though it will be readily understood that the graduations must vary according to the capacity of the ice box.

Carried by the rod 22 are holders 34 within which are secured rubber bumpers 35 which are designed to absorb the shock when the trolley 23 reaches the ends of its path of movement. The numeral 36 designates a cylindrical rod bent into the shape shown and which is for the purpose of lifting the dog 29 out of engagement with the notches in the plate 26 and this rod 36 is connected by a strip 37 with an angular rod 38 which has its end squared, as shown at 39, for engagement by a key 40. The rod 38 works in a bearing formed by a strip 41 rolled into tubular shape and having an annular portion 42 bolted on the plate 20 at the point of connection of the adjacent bracket 21. The rod 36 is movable within bearings 43 and 44 which are bolted onto the rod 22 and I provide a small spring 45 which operates to hold the rod 36 down and permit the dog 29 to catch in the teeth or notches 28.

The numeral 46 designates a relatively long arm formed as a suitable strip of metal which has one end formed with a longitudinal slot 47 engaging upon a pin 48 carried by the trolley structure 23. The numeral 49 designates a spindle which is journaled through one side of the ice box body A and which is journaled through a circular hole 50 formed in a bracket 51 off-set from the plate 20. The other end of the arm 46 carries a metallic piece 52 which works on the spindle 49 and which is bored around and provided with a notch 53 leading from the bore to the outside to engage a small pin 54 carried by the spindle 49 so that when the spindle 24 is turned to the right the notch 53 will engage the pin 54 and pull the arm 46 in one direction. When the tension on the spindle 49 is released the arm 46 will remain stationary until released by the key 40 which releases the dog 29 from engagement with the notches 28. Carried by the arm 46 is a spring 55 which is secured at its other end to the spindle 49. This spring operates to pull the metallic piece 52 into engagement with the pin 54. The spindle 49 is formed triangular in cross section so as to provide a knife edge where it bears upon the edge of the hole in the offset bracket 51.

Secured upon the plate 20 are lugs 56 upon which is secured a flanged cover 57 of the same shape as the plate 20 and provided with a sight opening 58 through which the scale 33 is visible. This sight opening is preferably covered by a sheet of glass and it should be stated that the cover 57 is provided with a suitable hole 59 through which the releasing key may be inserted.

Secured to the wall of the ice box body upon which the plate 20 is secured, is a flanged pipe or tubular housing 60 through which the spindle 49 operates and this spindle projects an appreciable distance beyond the inner face of this wall of the ice box body. This spindle 49 is adapted to be turned by mechanism to be hereinafter described.

Located within the bottom of the ice box body is a frame 61 which is formed open and which is fastened to the sides 62, 63 and 64 of the body and this frame includes a central cross piece 65 which serves as a brace. The frame is furthermore notched or recessed adjacent one corner, as shown at 66, for a purpose to be described. Centrally of this frame 61 is pivoted a wheel 67 provided with a radial arm 68. The number 69 designates a lever scale structure having all of its pins 70 formed with knife edges which of course bear upon metallic bearing surfaces whereby to reduce friction and provide a comparatively accurate or delicate scale structure. This scale structure includes beams 71 and braces 72 and mounted upon this frame is a suitable platform 73 which is inclined and ribbed, as clearly shown, for drainage into a waste funnel 74. Carried by one element of the scale structure is a hook 75 which is connected with a cooperating hook member carried by a flexible steep strip 76 which is in turn connected with a block-like member 77 which carries a rod 78 provided with a balancing weight 79. This member 77 is secured upon the spindle 49. The numeral 80 designates a bracket having a central hole 81 within which the inner end of the spindle 49 rests.

The arm 68 of the wheel 67 is connected by a rod 81 with an arm 82 carried by the lower end of a vertical shaft 83 journaled within suitable bearings 84. At its upper end the shaft 83 carries an arm 85 to which is connected, by a ball and socket connection, a rod 86 which is also connected by a fork 87 with a rod 88 which is bent into right angular shape and which extends through the adjacent wall of the ice box through suitable packing nuts and through a flanged tube 89 and which carries a knob 90 disposed exteriorly of the ice box above the plate 20. By turning the knob 90 it will be seen that the rod 88, rod 86, and arm 85 will be moved which will result in eventually turning the wheel member 67.

The letter B designates a door of the ice box and carried by the adjacent side next to the door are right angularly bent members 91 bored to permit free action of a rod 92 which is bent so as to hook over the rod 88 and to be released by a semicircular member 93 carried by the door B so that when the door is closed it will release the hook formed on the rod 92 from engagement with the rod 88 and permit free action of the rod 88. Secured to the rod 88 and the rod 92 is a small coil spring 94 which retains the rod 88 back near the hooked portion of the rod 92 which holds the wheel member 67 in such position that a cam projection 95 on this wheel member is under the short lever of the scale frame 69 and permits no action whatever of the scale. When the door is closed the hook 88 can be moved so that the wheel member 67 will be moved into such position that the cam projection 95 thereon will be out of engagement with the short lever of the scale construction. The rod 92 is provided with a coil spring 96 which tends to hold it in engagement with the rod 88 when the door B is open. The numeral 97 designates a sheet metal guard plate which covers the mechanism at the side of the ice box against injury by ice being placed within the box.

In the operation of the device it will be seen that when the door is open the scale is inoperative even though ice is placed upon the platform intended for its support. When the door B is closed it will be seen that the mechanism above described will operate the wheel member 67 so that the cam projection 95 thereon will be in non-obstructing relation to the short lever of the scale structure and the scale structure consequently operate. As a weight then comes upon the scale structure the hook 75 carried by the scale structure will pull upon the flexible strip 76 and consequently tend to rotate the block member 77 and this movement of the block member will of course rotate the spindle 49 and as the spindle is adapted for connection with the metallic piece 52 as above described, this movement of the spindle 49 will result in swinging of the arm 46 to the left which will move the trolley structure carrying the indicator which then passes over the graduations on the scale visible through the sight opening provided, so that the exact weight of the ice deposited within the refrigerator may be readily ascertained. Owing to the peculiar construction of the mechanism upon the plate 20, the indicator will remain in its initial indicating position, regardless of the melting away of the ice, until the operator resets the entire mechanism by means of the key provided for the purpose.

From the foregoing description and a study of the drawings it will be apparent that I have thus provided a simply constructed and easily installed automatic weight registering mechanism whereby the weight of ice placed within a refrigerator or the like may be readily ascertained, the construction being such that falsification by a dishonest ice dealer will be impossible as the recording mechanism cannot operate until the door is closed.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. In combination with a refrigerator, a platform scale structure located at the bottom thereof, a casing located exteriorly of the refrigerator and having a sight opening, a track way mounted within the casing, a trolley structure movable along said track way and carrying an indicator hand, a scale mounted behind the sight opening in the casing and moved over by said indicator, a connection between the scale structure and said trolley whereby to move the trolley in one direction when ice is placed on the platform scale structure, and a ratchet mechanism normally operated to hold the trolley structure against retrograde movement.

2. In combination with a refrigerator, a platform scale structure located at the bottom thereof, a casing located exteriorly of the refrigerator and having a sight opening, a track way mounted within the casing, a trolley structure movable along said track way and carrying an indicator hand, a scale mounted behind the sight opening in the casing and moved over by said indicator, a connection between the scale structure and said trolley whereby to move the trolley in one direction when ice is placed on the platform scale structure, and a ratchet mechanism normally operated to hold the trolley structure against retrograde movement, and key operated means for releasing said ratchet mechanism whereby to permit return of the parts to normal position.

3. In combination with a refrigerator, a platform scale structure located at the bottom thereof, a casing located exteriorly of the refrigerator and having a sight opening, a track way mounted within the casing, a trolley structure movable along said track way and carrying an indicator hand, a scale mounted behind the sight opening in the casing and moved over by said indicator, a connection between the scale structure and said trolley whereby to move the trolley in one direction when ice is placed on the platform scale structure, and a ratchet mechanism normally operated to hold the trolley structure against retrograde movement, and a connection between the door of the refrigerator and the indicating mechanism whereby to hold the latter inactive while the door is in open position.

4. In combination with a refrigerator, a platform scale structure located within the bottom thereof, a casing located exteriorly of the refrigerator and having a sight opening, a trackway mounted within said casing, a trolley structure movable along said trackway and carrying an indicator hand, a scale mounted behind the sight opening in the casing and moved over by said indicator, a connection between the scale structure and said trolley whereby to move the trolley in one direction when ice is placed on the platform scale structure, and means automatically locking said trolley in its shifted position.

5. In combination with a refrigerator, a platform scale structure located within the bottom thereof, a casing located exteriorly of the refrigerator and having a sight opening, a trackway mounted within said casing, a trolley structure movable along said trackway and carrying an indicator hand, a scale mounted behind the sight opening in the casing and moved over by said indicator, a connection between the scale structure and said trolley whereby to move the trolley in one direction when ice is placed on the platform scale structure, and means automatically locking said trolley in its shifted position, said means comprising a pivoted dog carried by the trolley, and teeth on the trackway engaged by the dog whereby to prevent retrograde movement of the trolley.

6. In combination with a refrigerator, a platform scale structure located within the bottom thereof, a casing located exteriorly of the refrigerator and having a sight opening, a trackway mounted within said casing, a trolley structure movable along said trackway and carrying an indicator hand, a scale mounted behind the sight opening in the casing and moved over by said indicator, a connection between the scale structure and said trolley whereby to move the trolley in one direction when ice is placed on the platform scale structure, means automatically locking said trolley in its shifted position, said means comprising a pivoted dog carried by the trolley, teeth on the trackway engaged by the dog whereby to prevent retrograde movement of the trolley, a pivoted rocker member within the casing adjacent the trackway positioned beneath said pivoted dog, and a key operable to move said rocker member to disengage the dog from the teeth.

In testimony whereof I affix my signature.

HARVEY J. LONG.